United States Patent [19]
Gracie

[11] Patent Number: 5,202,527
[45] Date of Patent: Apr. 13, 1993

[54] GUITAR STANCHION

[76] Inventor: John D. Gracie, 7013 Pomelo Dr., West Hills, Calif. 91307

[21] Appl. No.: 720,014

[22] Filed: Jun. 24, 1991

Related U.S. Application Data

[63] Continuation-in-part of Ser. No. 354,126, May 22, 1989, abandoned.

[51] Int. Cl.⁵ ............................................. G10D 3/00
[52] U.S. Cl. ...................................................... 84/327
[58] Field of Search .......................................... 84/327

[56] References Cited

U.S. PATENT DOCUMENTS

| | | | |
|---|---|---|---|
| 1,272,583 | 7/1918 | Vrubel | 84/327 |
| 1,945,162 | 1/1934 | Rasmussen | 84/327 |
| 2,510,799 | 6/1950 | Carley | 84/327 |
| 2,547,924 | 5/1949 | Citro | 84/327 |

FOREIGN PATENT DOCUMENTS 19014 of 1911 United Kingdom ................. 84/327

*Primary Examiner*—Michael L. Gellner
*Assistant Examiner*—Cassandra Spyrou
*Attorney, Agent, or Firm*—Jack C. Munro

[57] ABSTRACT

A stanchion for supporting a guitar in a fixed position. The upper end of the stanchion includes a saddle upon which is to be fixedly mounted the guitar. The stanchion is adjustable in height from the supportive surface upon which the stanchion is mounted. The stanchion also permits adjusting movement of the guitar along the X-axis, Y-axis, and Z-axis. Once a particular desired orientation of the guitar is obtained, the adjustment can be fixed thereby fixing the position of the guitar.

7 Claims, 2 Drawing Sheets

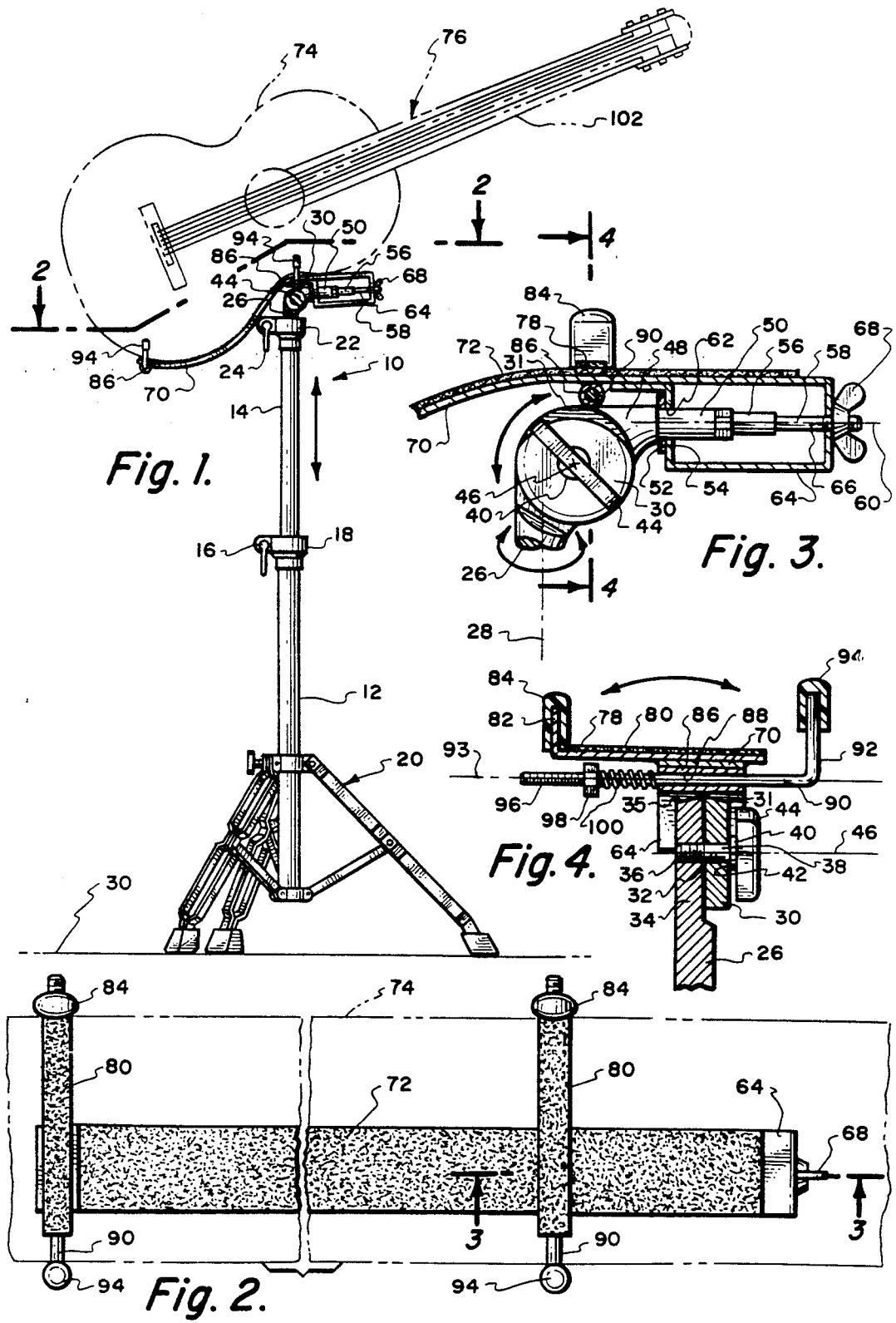

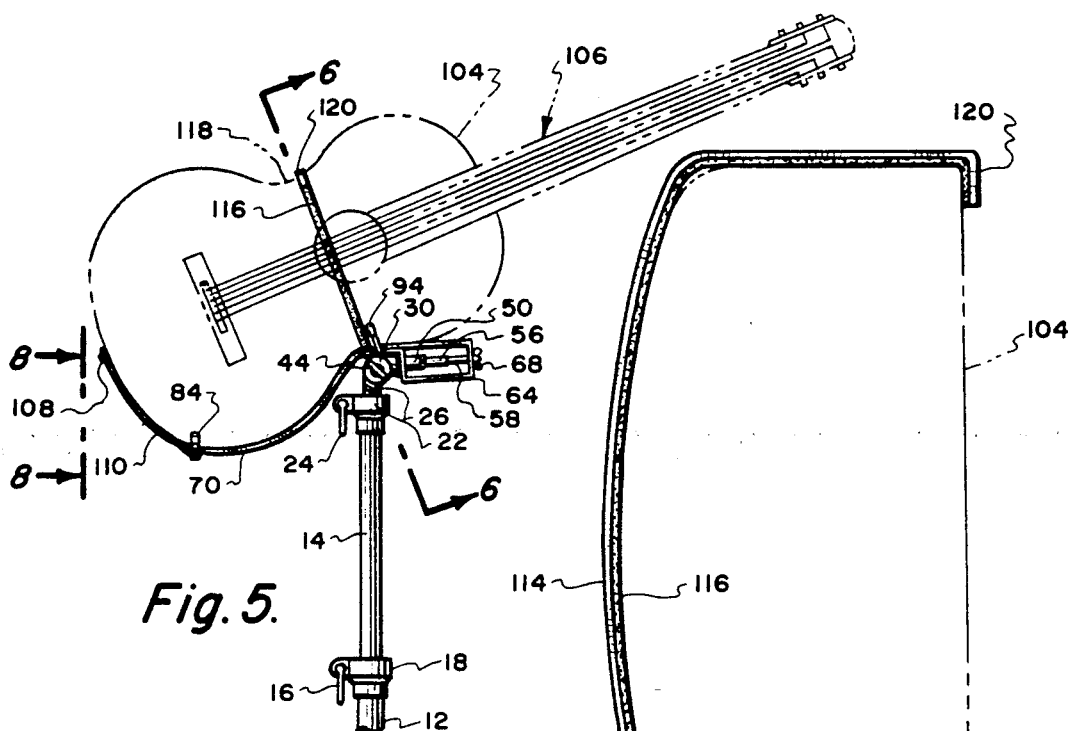
Fig. 5.
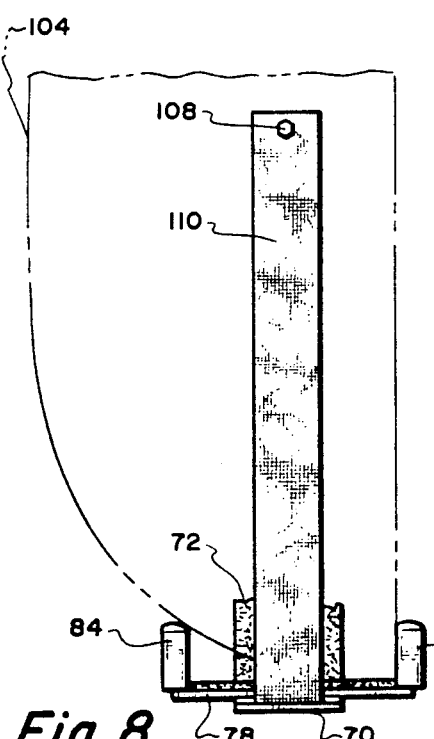
Fig. 8.
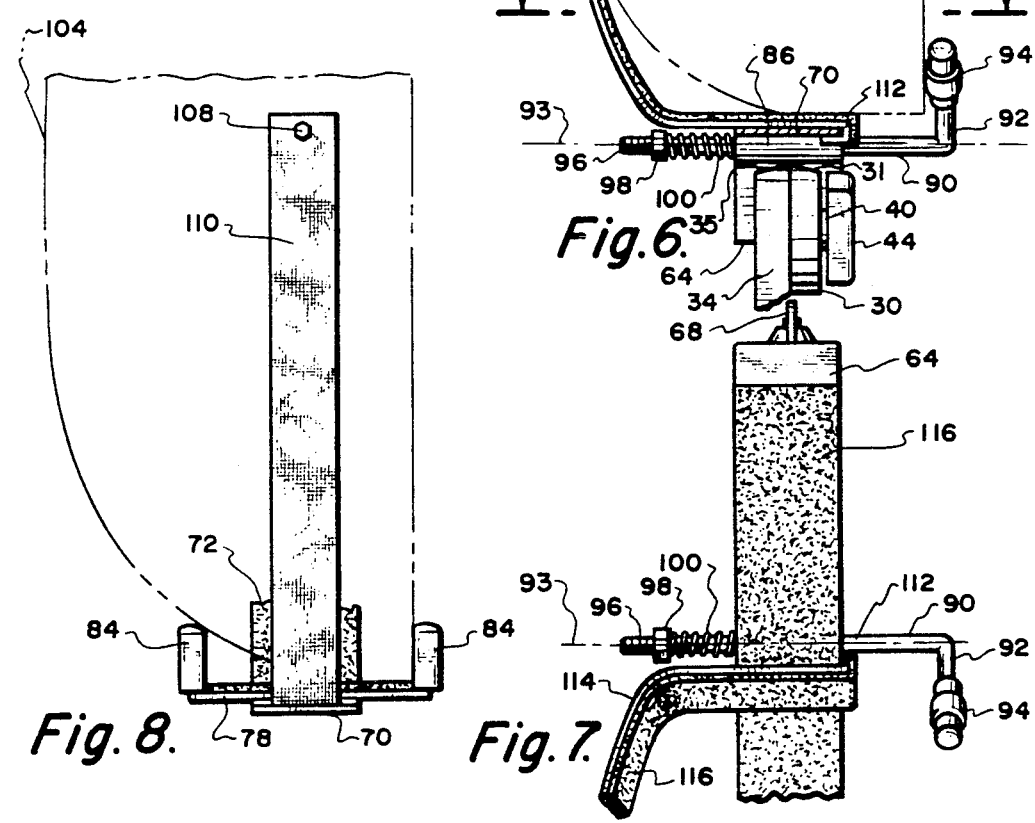
Fig. 6.
Fig. 7.

GUITAR STANCHION

REFERENCE TO PRIOR APPLICATION

This application is a continuation-in-part of U.S. Pat. application, Ser. No. 07/354,126, filed May 22, 1989, now abandoned, by the same title.

BACKGROUND OF THE INVENTION

The structure of the present invention relates to stanchions and more particularly a stanchion that is designed primarily to be used in conjunction with the music industry and particularly for a performer that is performing on stage.

Many performers are able to play different musical instruments. A performer who utilizes a guitar as a musical instrument may frequently play different types of guitars. Common different types of guitars are the classic, flamenco, plectrum, acoustic, 12-string, Hawaiian, and electric.

It is common that a given performer may play an electric guitar through most of his or her performance and then, during a certain time within the performance, may switch to an acoustic guitar. The electric guitar is normally supported on the performer by means of a supporting strap. Normally, the performer would have nearby an acoustic guitar which may be supported in an upright position with a stand that is located on the stage near the performer. A typical procedure for the performer to switch from the electric to the acoustic guitar would require the performer to move the electric guitar to an out-of-the way position, such as against the back of the performer, and then pick up the acoustic guitar and play such.

The switching from the one guitar to another frequently must occur quite rapidly because the switching is to occur during the playing of a song. This means that the performer may only have one-half second or less in which to switch from one instrument to another. For the performer to move the electric guitar to an out-of-the-way position, then pick up the acoustic guitar and place it in the proper position, and then proceed to play the acoustic guitar, may take longer than the required time period. This means that an error would result in the performing of the song which can normally be readily perceived by the audience.

It would therefore be desirable to locate the acoustic guitar in a ready-to-play position not requiring any picking up and positioning of the acoustic guitar. The performer only needs to move the electric guitar in an out-of-the-way position and set up the acoustic guitar and begin to play this guitar.

SUMMARY OF THE INVENTION

The primary objective of the present invention is to construct a stanchion, upon which can be fixedly mounted in a position preferred by the individual, a musical instrument such as a guitar so that the performer only need to position himself directly adjacent the instrument to affect playing of the instrument.

Another objective of the present invention is to construct a guitar mounting stanchion which can be readily disassembled and collapsed when not in use to facilitate portability.

Another objective of the present invention is to construct a stanchion which provides various adjustments so that the musical instrument can be precisely located at the playing position for the particular individual that is playing the instrument and the stanchion is capable of being used with any performer and located in a precise playing position for that particular performer.

The structure of the present invention is directed to a stanchion which is composed of a pair of tubular telescoping connected together members which are mounted on a tripod base. The tripod base is to be located on a supportive surface such as the stage. The upper end of the tubular members has mounted thereto a rod which is capable of pivoting three hundred sixty degrees on this tubular member providing the Y-axis degree of movement. This rod is integrally connected to a first disc-shaped plate which joins with a second disc-shaped plate with the second disc-shaped plate being capable of pivoting relative to the first disc-shaped plate providing a Z-axis degree of movement. The second disc-shaped plate is integrally connected to a mounting rod. Mounted on this mounting rod is a saddle. This saddle is pivotable on the mounting rod providing a X-axis degree of movement. The saddle is to be fixedly mounted onto the body of a guitar. The fixing to the body of the guitar is accomplished through the use of one or more of movable fingers mounted on the saddle. These movable fingers are spring-biased and to be maintained in continuous tight engagement with the body of the guitar. These fingers are to be pivotable relative to the saddle to establish precise positioning.

BRIEF DESCRIPTION OF THE DRAWINGS

FIG. 1 is a front elevational view of the stanchion of the present invention showing a typical acoustic guitar being mounted on the stanchion and supported in a playable position;

FIG. 2 is a top plan view of the stanchion of the present invention taken along line 2—2 of FIG. 1;

FIG. 3 is a cross-sectional view through the saddle and the attachment utilized t connect the saddle of the tubular extension of the stanchion taken along line 3—3 of FIG. 2;

FIG. 4 is a cross-sectional view taken along line 4—4 of FIG. 3;

FIG. 5 is a view similar to FIG. 1 showing the use of the stanchion of the present invention in conjunction with a different form of guitar where the back of the guitar assumes a more rounded configuration;

FIG. 6 is a view, partly in cross-section, taken along line 6—6 of FIG. 5 showing clearly the waist clamp that is utilized to support the guitar showing in FIG. 5;

FIG. 7 is a view, partly in cross-section, taken along line 7—7 of FIG. 6; and

FIG. 8 is an end view of the saddle taken along line 8—8 of FIG. 5.

DETAILED DESCRIPTION OF THE SHOWN EMBODIMENTS

Referring to the drawings, there is shown in FIG. 1 the stanchion 10 of this invention which is formed generally of a main elongated tubular member 12 which telescopingly connects to a tubular extension 14. Tubular extension 14 is to be adjustable on the telescoping member in conjunction with the tubular member 12 and once a particular desired position has been obtained, the tubular extension 14 is fixed by manual turning of bolt fastener 16 which moves a clamping member 18 tightly onto tubular extension 14. Attached to the bottom of the tubular member 12 is a collapsible tripod leg assembly 20. Basically, the leg assembly 20 and the tubular members 12 and 14 comprise what is generally termed a cymbal stand.

The upper or outer end of the tubular extension 14 has mounted thereon a clamp 22. The clamp 22 is capable of being loosened and tightened by manual operation of fastener 24. Telescopingly connected within the clamp 22 and the tubular extension 14 is a rod 26. The rod 26 is capable of being pivoted three hundred sixty degrees about a Y-axis 28. The vertical height of the rod 26 from the supportive surface 30 is also adjustable by moving of tubular extension 14 in a telescoping manner within the tubular member 12.

The rod 26 is integrally connected to a disc-shaped plate 34. The plate 34 abuts against a similarly shaped disc-shaped plate 30. The plate 30 has a centrally disposed through hole 32. Centrally disposed within the plate 34 is a threaded hole 36. Threadably engaged with the threaded hole 36 is a threaded rod 38. This threaded rod 38 extends through the hole 32 and is integrally attached to enlarged cylindrical shaped portion 40. Cylindrical shaped portion 40 has an inwardly extending annular flange 42. The flange 42 is to abut against exterior surface of the plate 30 about the hole 32. Integrally attached to the outer surface of the cylindrically shaped portion 40 is a handle 44.

With the handle 44 located in a loosened position, the plate 34 is capable of pivoting about a Z-axis 46 relative to the plate 30. This pivoting movement would normally be limited to something less than one hundred eighty degrees although actually it is not anticipated that in normal use that this pivoting would exceed thirty degrees. Once a desired position between plates 30 and 34 has been obtained, the operator then tightens handle 44 which tightly presses together the plates 30 and 34 thereby putting these plates in a fixed position.

In actual practice, the handle 44 and its attached threaded rod 38 could be removed and reversed to accommodate individualistic desires of the user. There will be a coil spring (not shown) located between the discs 30 and 34 which causes separation of the discs when handle 44 is loosened. The abutting surfaces of discs 30 and 34 are serrated to establish a positive interconnection of the discs when tightened.

Integrally connected to the plate 34 and extending outwardly therefrom is an annular extension 48. Integrally connected to the extension 48 is a rod section 50. Formed between the annular extension 48 and the rod section 50 is an annular shoulder 52. Abutting against this shoulder 52 is a conventional lock washer 54. Integrally connected and extended from the rod section 50 is a smaller diametered rod section 56. Also integrally connected from the rod section 56 is a threaded bolt 58. The outer surfaces of the rod sections 50 and 56 plus the bolt 58 are all concentric to the centrally located X-axis 60.

The rod section 50 is to connect with a hole 62 formed within the inner wall of a box-shaped sheet material member 64. Threaded bolt 58 is conducted through a hole 66 formed within the outer edge of the box member 64. A conventional wing nut 68 threadably engages with the bolt 58. The box member 64 is capable of pivoting a limited amount about the X-axis 60 by pivoting on the bolt 58 and the rod section 50. The limiting of the pivoting of box member 64 will be described further on in the specification. Normally, this pivoting does not exceed thirty degrees.

The box member 64 is supported by two spaced apart points, one on the rod 50 and the other on bolt 58. This spacing essentially eliminates wobble of the guitar 76 and produces a firm support base for the guitar 76 that doesn't loosen after years of usage of the stand 10 of the invention. Wobbling of the guitar 76 must be prevented as it can cause the musician to miss notes during playing of the guitar 76. The spacing apart of the X-axis 60, the Y-axis 28 and the Z-axis 46, so these axes do not intersect one another, further eliminates wobble of the guitar 76.

The box section 64 is welded or otherwise integrally secured to a saddle plate 70. The inside surface of the saddle plate 70 is covered with a resilient layer 72. Resilient layer 72 can comprise fabric, felt or other similar type of cushiony material.

The saddle plate 70 is designed to conform to the side wall of the body 74 of a conventional acoustic or electric guitar 76. Mounted on the inner surface of the saddle plate 70 are a pair of cross strips 78. It is understood that the cross strips 78 are located in a spaced apart manner. The upper surface of each of the strips 78 will also be covered by a cushiony material 80. The outer end of each of the cross strips 78 includes an upturned end 82. Each upturned end 82 is covered by a rubber or plastic sleeve 84.

Fixedly mounted, as by welding, to the undersurface of the saddle plate 70 are a pair of tubes 86. Tubes 86 are identical and are spaced apart with actually a tube 86 located directly adjacent a strip 78 and a second tube 86 located directly adjacent the other strip 78. Each tube 86 includes a through hole 88. Slidingly mounted within the through hole 88 is a rod 90. the outer end of the rod 90 is formed in a ninety degree angled section 92 which is covered by a rubber or plastic covering sleeve 94. The outer end of the rod 90 includes a series of screw threads 96 with there being a conventional nut 98 connecting with the threaded section 96. Between the nut 98 and the tube 86 is a coil spring 100.

Rod 90 can be moved within the through opening 88 relative to the tube 86. This movement is such that the section 92 is capable of moving away from the upturned end 82 and, when the spring 100 is completely compressed, further movement is not possible. If further movement in that direction is desired, it is only necessary to move nut 98 in an outward direction along the threaded section 96. With the body 74 located on the saddle plate 70, the sections 92 are pivoted so that they are not able to contact the body 74. At this time, the operator then individually grabs section 92 of each rod 90 and pulls outwardly compressing the spring 100. The location of the nut 98 will be such that at or near the maximum compression of the spring 100 the section 92 and the sleeve 94 will just clear the frontal surface of the body 74. If it does not clear the frontal surface of body 74, nut 98 is threaded outwardly until this can occur. In other words, nut 98 is to provide adjustment so the stand 10 can accommodate to a wide variety of different thicknesses of body 74.

Then by pivoting of each section 92, each of the sleeves 94 is to be moved in juxtaposition with the front surface of the body 74 and actually be located right at the edge of the body 74. This location along the edge of the body 74 is important so as to have the "fingers" not interfere with the sound reproduction (vibration) of the body 74 or any control knobs which may be mounted on the body 74 near the edge. The operator then releases each of the sections 92 which permits the biasing action of the spring 100 to move the sleeves 94 into tight engagement with the edge of the front surface of the body 74. The body 74 is now tightly held between sleeves 94 and 84.

It can thus be seen in reference to FIGS. 1 through 4 of the drawings that the guitar 76 is fixedly supported onto the saddle plate 70. The guitar 76 can be adjusted in height by moving tubular extension 14 relative to tubular extension 12. Turning of the guitar 76 is permitted by pivoting rod 26 relative to tubular extension 14. Canting of the guitar 76, that is having the neck 102 of the guitar 76 be located at various inclined angles, is permitted by loosening of the handle 44 and moving of plate 34 relative to plate 30. Tilting of the guitar 76 either forwardly or rearwardly is permitted by loosening of wing nut 68 which permits the box member 64 to be pivoted on the rod 58 and the rod section 50. This pivoting of box member 64 is limited (as previously mentioned) by means of arcuate chamfered surface 35 formed on the top edge of plate 34 and arcuate chamfered surface 31 formed on the top edge of plate 30. Tube 86 rests directly adjacent (but may not physically touch) the abutting surfaces of plates 30 and 34. Tilting of the guitar rearwardly will be stopped (at about fifteen degrees from horizontal) by tube 86 abutting chamfered surface 35.

It is important to the present invention that adjustability of the sleeve 94 is permitted so that these sleeves 94 can be positioned at a location against the front surface of the body 74 so there is neglible effect on the sound reproduction of body 74. This is usually at the peripheral edge of the body 74. Some guitars have sound emitting holes located near the edge and it is desirable to have the sleeve 94 not interfere with such a hole. This is accomplished by pivoting of each sleeve 94 on a pivot axis 93 which is perpendicular to the front surface of body 74. It is to be noted that there are two (in number) of pivot axes 93, one for each rod 90. Each rod 90 is to be pivoted independently. Each pivot axis 93 is located directly adjacent to saddle plate 70 and directly adjacent to the surface of saddle plate 70 that is not contacted by the body 74, in other words, beneath saddle plate 70. This locating of each pivot axis 93 is to provide for maximum adjustability which is one hundred eighty degrees.

Reference now is to be had in particular to FIGS. 5 through 8 of the drawings in which a round back body 104 of a guitar 106 is shown. The only difference in the structure of FIGS. 5 through 8 over that of FIGS. 1 through 4 has to do with fixedly supporting of the guitar 106. The fact that the guitar 106 has a rounded back makes it very difficult to fixedly secure on a stand as opposed to the square back configuration of the guitar 76. For purposes of this invention, the structure shown in FIGS. 5 and 8 embodies reference numerals of like parts relative to FIGS. 1 and 4 and reference is to be had thereto for a description of those particular parts.

The bottom of the body 104 includes a button 108. A flexible strap 110 connects with this button 108. The strap 110 is fixedly secured onto the saddle plate 70. Near this area of securement and mounted on the inside surface of the saddle plate 70 are a pair of fixed type of fingers defined by sleeves 84. One of the sleeves 84 is to connect with the front surface of the body 104 of the guitar 106 with the other of the sleeves 84 to abut against the rounded back of the body 104. This arrangement is clearly shown in FIG. 8 or the drawings. Also, attached to the outer surface on the plate 70 is one of the tubes 86 with a spring biased finger in the form of rod 90 and resilient sleeve 94 connecting with the tube 86.

Located directly adjacent this tube 86 is a turned over end 112 of a band 114. The inner surface of the band 114 includes a cushiony material 116. The turned over end 112 snugly engages with the forward edge of the plate 70. The band 114 is located about the waist 118 of the body 104 of the guitar 106. The outer free end of the band 114 is formed into a right angled portion 120 which just engages with the frontal edge of the body 104. Thereafore, by the body 104 being confined with the band 114 and the sleeve 94 being in tight engagement with the front surface of the body 104, the guitar 106 is securely held in position on the plate 70 with this securement being made positive through the use of flexible strip 110.

What is claimed is:

1. An stanchion for supporting a guitar in a fixed position, said guitar having a side wall and a front, said stanchion comprising:

a saddle plate conforming to the side wall of the body of a guitar to physically support in a fixed position the body of the guitar, said conforming causes said saddle plate to be arcuate when observed from the front of said guitar; and a stand adapted to be located on a supportive surface, said stand having an upper end spaced furthest from the supportive surface, said saddle plate being mounted by attachment means on said upper end, said attachment means permitting separate rotational adjusting movement of said saddle plate on the X-axis and the Y-axis and the Z-axis with said X-axis not intersecting said Y-axis or said Z-axis and said Y-axis not intersecting said Z-axis, said attachment means including a rod section, a threaded both attached to said rod section, the longitudinal center axis of said threaded both and said rod section being in alignment forming said X-axis, a box member fixed to said saddle plate, said box member being pivotally mounted on said rod section and said threaded bolt, said rod section providing a first supporting point for said saddle plate, said threaded both providing a second supporting point for said saddle plate, said first supporting point being spaced from said second supporting point, said first and second supporting points essentially eliminating wobble of the guitar.

2. The stanchion as defined in claim 1 wherein:

said saddle plate including a plurality of pairs of fingers, each pair of said fingers being oriented to define a space therebetween with the body of the guitar to be located in said space, each said pair of fingers including two in number of opposed fingers, at least one of said opposed fingers being lineally movable in a direction toward and away from the other said opposed finger so as to vary the width of said space, said finger that is lineally movable being adjustable to increase or decrease the maximum said away from movement so said finger that is lineally movable is made to accommodate to a particular width of body of guitar, said finger that is lineally movable being continuously spring biased to minimize the width of said space.

3. The stanchion as defined in claim 2 wherein:

said finger that is lineally movable also being pivotable relative to said saddle plate on a pivot axis so as to be locatable at various positions relative to said saddle plate and the body of the guitar, said pivot axis being located exteriorly (spaced from the body of the guitar) of said saddle plate and directly adjacent to said saddle plate, said pivot axis being perpendicular to the front surface of the guitar.

4. The stanchion as defined in claim 1 where:

said saddle plate including a flexible strap and a body clamp, said body clamp being adapted to be located across the waist of the guitar, said flexible strap adapted to be located at the bottom edge of the guitar.

5. The stanchion as defined in claim 1 wherein:

said Z-axis adjusting movement being due to including a pair of abutting plates within said attachment means and permitting pivoting of one of said plates to the other of said plates.

6. The stanchion as defined in claim 5 wherein:

said plates including stop means for limiting the movement of said box member on said X-axis.

7. The stanchion as defined in claim 6 wherein:

said stop means comprising chamfered areas formed on said plates.

* * * * *